J. BROUGHTON.
ROTARY PUMP.
No. 397.
Reissued Sept. 30, 1856.
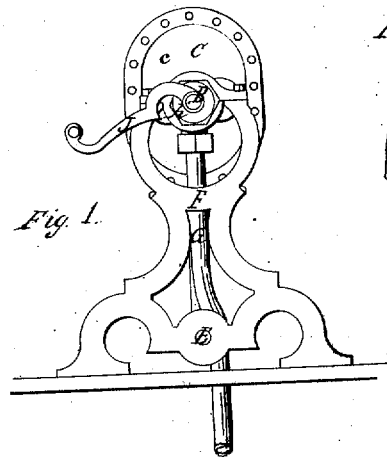
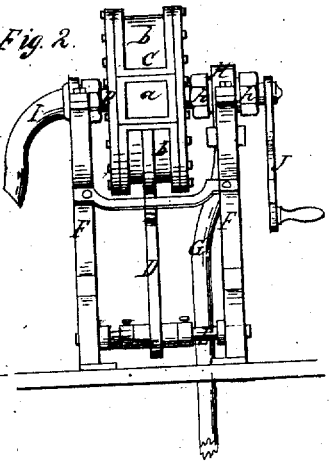
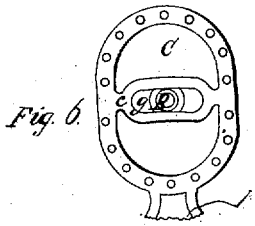
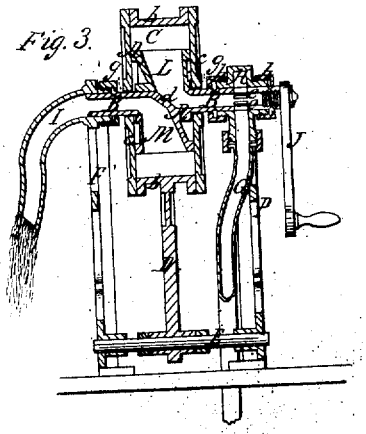
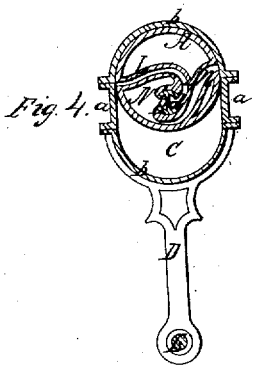
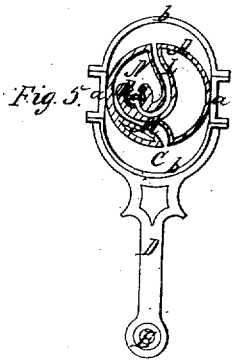

UNITED STATES PATENT OFFICE.

JOHN BROUGHTON, OF CHICAGO, ILLINOIS.

IMPROVEMENT IN ROTARY PUMPS.

Specification forming part of Letters Patent No. 15,059, dated June 10, 1856; Reissue No. 397, dated September 10, 1856.

*To all whom it may concern:*

Be it known that I, JOHN BROUGHTON, of Chicago, in the county of Cook and State of Illinois, have invented a new and Improved Rotary Pump, which is also applicable as a steam-engine; and I do hereby declare that the following is a full, clear, and exact description of the same, reference being had to the accompanying drawings, forming part of this specification, in which—

Figures 1 and 2 are elevations, at right angles to each other, of the improved pump adapted to the raising of water. Fig. 3 is a vertical section in a plane passing through the axis of rotation of the eccentric piston A. Fig. 4 is a vertical section of the oscillating barrel C and piston A in a plane perpendicular to the axis of rotation of the piston. Fig. 5 is a similar section to Fig. 4, but with the piston in a different position. Fig. 6 is an external view of the barrel.

Similar letters of reference indicate corresponding parts in the several figures.

The distinguishing characteristic of this pump consists of its being composed of a rotary eccentric piston fitted within a barrel which derives an oscillating movement from the rotary movement of the piston, while the piston by its rotation, combined with the oscillation of the barrel, is caused to move reciprocally toward and from each end of the barrel, and thereby, without the aid of valves, alternately to form a vacuum to draw water into either end of the barrel through a suitable inlet and force it out again through a suitable outlet.

A is the piston, which is of metal, of cylindrical form, hollow, and with open ends, and secured to a hollow shaft, B, which is eccentric to but parallel with its axis, and is supported and fitted to rotate in stationary bearings supported on standards F F. The shaft B is hollow, and has a transverse partition, *d*, at about the middle of the piston, which separates one portion, which is to serve as an inlet from the suction-pipe G to the barrel C, from the other portion, which is to serve as an outlet from the barrel C to the discharge-pipe I The inlet portion of the shaft is closed at its extremity, to make it solid to attach a hand-crank, J, or other suitable means of driving it, and its communication with the suction-pipe G is made by forming a chamber, H, around one of its bearings, providing slots in the bearing, as shown at *e e*, Fig. 3, and attaching the suction-pipe to the said chamber, the ends of which are packed around the shaft with stuffing-boxes *h h*, as shown in Fig. 3. The open extremity of the outlet portion of the shaft is connected with the discharge-pipe I. The inlet portion of the shaft connects with a hollow arm or passage, L, running through the piston and terminating in the periphery thereof, and the outlet portion connects with an air-chamber, N, cast within the piston, and from this air-chamber there is a passage, M, terminating in the periphery of the piston diametrically opposite the termination of the passage L.

The barrel C, which contains the piston A, is of metal. It is in its transverse section, or in its section taken in any plane parallel with the axis of rotation of the piston, of quadrangular form, as shown in Fig. 3; but in its section perpendicular to the axis of the piston it is of the form of a figure having two parallel sides and two arched ends, as shown in Fig. 4. It is firmly attached to an arm, D, which is fitted to oscillate freely on a fixed pivot or shaft, E, secured in the standards F F.

It is made in six parts, viz: the two parallel side plates, *a a*, the arched ends *b b*, and the face-plates *c c*, all bolted together. The face-plates *e e* are provided each with a slot, *g*, described from the center of oscillation, E, of the barrel, to allow the shaft B of the piston to pass through and admit of the oscillation of the barrel. The piston fits between the side plates, *a a*, and face-plates *c c*, which are all faced truly, the periphery of the piston being in contact with the plates *a a*, and the ends thereof with the face-plates *c c*. The periphery of the piston does not require to be fitted with packing, as the side plates, *a a*, may be adjusted to compensate for wear; but the ends of the piston may be fitted with metal packing-rings to work in contact with the face-plates *c c*, and rings of india-rubber or springs may be placed behind these rings to keep them in contact with the face-plates with very little friction.

The operation of the pump is as follows: Rotary motion being communicated to the piston by power applied to its shaft, it gives to the barrel an oscillating movement, and makes a reciprocating movement within the barrel, alternately enlarging and contracting the space between it and either end of the barrel, at each stroke forming a vacuum on one side of the piston, into which the water is drawn through the suction-pipe, and driving out from the barrel on the other side of the piston the water which was drawn in at the previous stroke. Supposing the piston in rotating in the direction of the arrow shown in Fig. 4 to have arrived at the upper end of its stroke, or at its position nearest the top of the barrel, as shown in that figure, the lower portion of the barrel will be filled with water, which came in through the hollow arm or passage L as the piston moved up in the barrel. The opening of the said hollow arm or passage L is just below the point of contact of the straight portion of the barrel and the periphery of the piston, while the opening of the passage M in the other side of the piston is just above the point of contact. Consequently a slight motion of the piston beyond this position cuts off the communication of L with the lower part of the barrel, and brings it in communication with the upper part thereof as the pistom moves down, while the same motion brings the opening of the arm M in communication with the water below the piston, and as the piston moves down water is drawn into the upper part of the barrel through the suction-pipe and passage L, and forced out the lower part through the passage M and chamber N to the discharge-pipe. When the piston has made half a revolution and arrived to its position nearest the bottom of the barrel, the ports of ingress and egress assume relatively the same position as when it was at the top, and as the piston moves up in the barrel by its own continued revolution the action of the pump is exactly the same as when it moves down, with the exception that the water enters below and is discharged from above.

The position of the barrel of the pump may be the reverse of that represented in the drawings—that is to say, the barrel may be suspended below its center of oscillation, like a pendulum.

The pump may be used either for raising water or as a force-pump.

It is obvious from this description of my pump that it may, by the mere changes of detail obvious to those skilled in such machiney, be converted into an effective steam-engine, acting as a rotary engine composed of a rotary eccentric piston operating within an oscillating barrel.

What I claim as my invention, and desire to secure by Letters Patent, is—

The rotary eccentric piston working within an oscillating barrel, with any arrangement of inlet and outlet passages, substantially as herein set forth, and this I claim whether my invention be applied to a pump or a rotary steam-engine.

JOHN BROUGHTON.

Witnesses:
C. D. WOLF,
A. NEP.